(12) United States Patent
Furton et al.

(10) Patent No.: US 11,129,363 B2
(45) Date of Patent: Sep. 28, 2021

(54) POLYMER-BASED TRAINING AIDS AND METHODS OF USE

(71) Applicants: Kenneth G. Furton, Homestead, FL (US); Michelle Cerreta, Alexandria, VA (US); Abuzar Kabir, Miami, FL (US)

(72) Inventors: Kenneth G. Furton, Homestead, FL (US); Michelle Cerreta, Alexandria, VA (US); Abuzar Kabir, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 1097 days.

(21) Appl. No.: 15/149,851

(22) Filed: May 9, 2016

(65) Prior Publication Data

US 2016/0324120 A1 Nov. 10, 2016

Related U.S. Application Data

(60) Provisional application No. 62/159,006, filed on May 8, 2015.

(51) Int. Cl.
*A01K 15/02* (2006.01)
*C08K 5/101* (2006.01)
(Continued)

(52) U.S. Cl.
CPC .............. *A01K 15/02* (2013.01); *C08G 77/80* (2013.01); *C08K 5/101* (2013.01); *C09D 183/08* (2013.01);
(Continued)

(58) Field of Classification Search
None
See application file for complete search history.

(56) References Cited

U.S. PATENT DOCUMENTS 4,260,517 A * 4/1981 Woodford ................ C09K 3/00
424/10.4
2011/0046404 A1 * 2/2011 Sharma ................ A61K 9/0075
556/10

(Continued)

FOREIGN PATENT DOCUMENTS

WO WO-2013078551 A1 * 6/2013 ........... C09B 67/009

OTHER PUBLICATIONS

Chong, S. L. et al. "Sol-gel coating technology for the preparation of solid-phase microextraction fibers of enhanced thermal stability," *Analytical Chemistry*, 1997, 69(19):3889-3898.
(Continued)

*Primary Examiner* — Dominic Lazaro
(74) *Attorney, Agent, or Firm* — Saliwanchik, Lloyd & Eisenschenk (57) ABSTRACT

The subject invention provides the materials and methods for synthesizing novel training devices for biological detectors, such as canines, to locate a specific material by recognizing a characteristic scent associated with the material. In an exemplary embodiment, the training devices encapsulate at least one active odorant of certain illicit materials, such as cocaine, within a sol-gel polymer network. By manipulating the process of molecular encapsulation and polymer network synthesis, the novel training devices can reduce the influence of contaminants and dissipate the encapsulated odorant in a controlled fashion, allowing for the added benefit of improved shelf-life as compared to currently available training devices.

14 Claims, 6 Drawing Sheets

(51) Int. Cl.
    *C08G 77/00*      (2006.01)
    *C09D 183/08*    (2006.01)
    *C08G 77/28*      (2006.01)

(52) U.S. Cl.
    CPC ........ *C08G 77/28* (2013.01); *C08K 2201/007* (2013.01)

(56) References Cited

U.S. PATENT DOCUMENTS

| | | | |
|---|---|---|---|
| 2012/0056341 A1* | 3/2012 | Magdassi | A61K 8/11 264/4 |
| 2012/0237578 A1* | 9/2012 | Lei | B01J 13/18 424/401 |

OTHER PUBLICATIONS

Ekberg, B. et al., "Molecular Imprinting—A Technique for Producing Specific Separation Materials," *Trends in Biotechnology*, 1989, 7(4):92-96.

Farrington, K. et al., "Molecularly imprinted sol gel for ibuprofen: An analytical study of the factors influencing selectivity," *Talanta*, 2009, 78(3):653-659.

Furton, K. G. et al., "The scientific foundation and efficacy of the use of canines as chemical detectors for explosives" *Talanta*, 2001, 54:487-500.

Gazit, I. et al., "Domination of olfaction over vision in explosives detection by dogs," *Appl Anim Behav Sci*, 2003, 82:65-73.

Harper, R. J. et al., "Biological Detection of Explosives," *Counterterrorist Detection Techniques of Explosives*, 2007; pp. 395-431.

Harper, R. J. et al., "Identification of dominant odor chemicals emanating from explosives for use in developing optimal training aid combinations and mimics for canine detection," *Talanta*, 2005, 67(2):313-327.

Koppetschik, K., "Photodegradation of Organic Photochromic Dyes Incorporated into Ormosil Matrices," 2000.

Lorenzo, N. et al., "Laboratory and field experiments used to identify *Canis lupus* var.familiaris active odor signature chemicals from drugs, explosives, and humans," *Anal Bioanal Chem*, 2003, 376:1212-1224.

Malnic, B. et al., "Combinatorial Receptor Codes for Odors," *Cell*, 1999, 96:713-723.

Siouffi, A.-M. et al., "Silica gel-based monoliths prepared by the sol-gel method: facts and inquires," *Journal of Chromatography*, 2003, 1000:801-818.

Williams, M. et al., "Canine detection odor signatures for explosives," *Proc.SPIE—Int.Soc.Opt.Eng. 3575[Enforcement and Security Technologies]*, 1998, Abstract only.

\* cited by examiner

POLYMER-BASED TRAINING AIDS AND METHODS OF USE

CROSS-REFERENCE TO A RELATED APPLICATION

This application claims the benefit of U.S. provisional application Ser. No. 62/159,006, filed May 8, 2015, which is incorporated herein by reference in its entirety.

BACKGROUND OF INVENTION

Biological detector animals, such as canines, are valuable tools for the rapid, onsite detection of illicit materials; however, they require extensive training to ensure field deployability with high degree of reliability. The forensic science field and legal community widely accept the use of detector dogs (Furton, K. G.; Myers, L. J. "The scientific foundation and efficacy of the use of canines as chemical detectors for explosives" *Talanta* 54:487-500, 2001). Even with technological advances in instrumentation, canines represent one of the most reliable, real-time detectors (Lorenzo, N.; Wan, T.; Harper, R. J.; Hsu, Y.-L.; Chow, M.; Rose, S.; Furton, K. G. "Laboratory and field experiments used to identify Canis lupus var.familiaris active odor signature chemicals from drugs, explosives, and humans," *Anal Bioanal Chem* 376:1212-1224, 2003). Canines have unusually high olfactory capabilities, containing approximately 1300 genes in their olfactory repertoire—nearly twenty times more than humans. This allows for canines to be trained on many diverse odors with enhanced sensitivity (Gazit, I.; Terkel, J. "Domination of olfaction over vision in explosives detection by dogs," *Appl Anim Behav Sci* 82:65-73, 2003; Harper, R. J.; Furton, K. G. "Biological Detection of Explosives. In Counterterrorist Detection Techniques of Explosives," Yinon, J., Ed.; Elsevier B. V.: 2007; pp 395-431). Canines can theoretically discriminate between one billion odors because odorants have been shown to activate multiple olfactory receptors at once (Malnic, B.; Hirono, J.; Sato, T.; Buck, L. "Combinatorial Receptor Codes for Odors," *Cell* 96:713-723, 1999).

Figure 1:
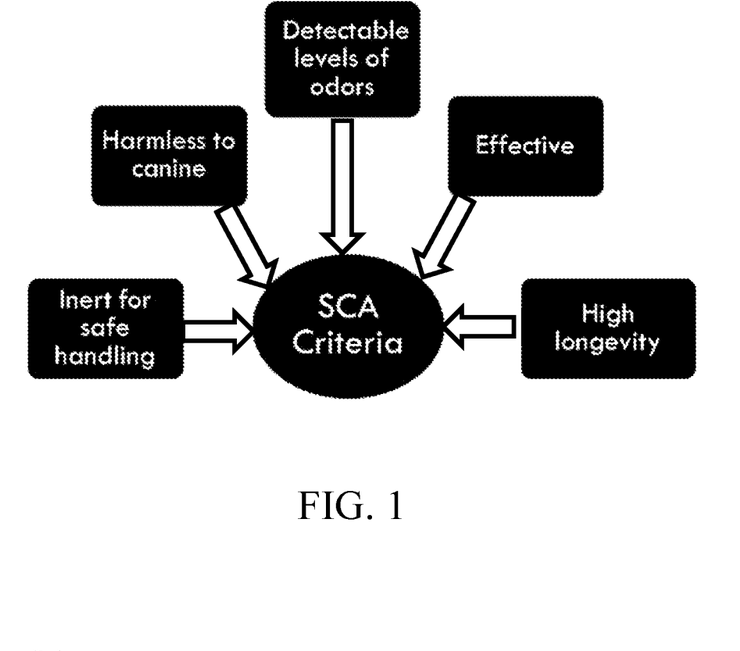
FIG. 1 demonstrates the various criteria that must be met for a given surrogate continuation aid.

Prior research has shown that canines often alert to a scent associated with the forensic specimen rather than the specimen itself. By determining this active odor of the illicit material or the odor that elicits an alert response from detection canines, researchers can create training aids that may assist in the training of canines on specific illicit materials (Lorenzo, N.; Wan, T.; Harper, R. J.; Hsu, Y.-L.; Chow, M.; Rose, S.; Furton, K. G. "Laboratory and field experiments used to identify Canis lupus var.familiaris active odor signature chemicals from drugs, explosives, and humans," *Anal Bioanal Chem* 376:1212-1224, 2003; Williams, M.; Johnston, J. M.; Cicoria, M.; Paletz, E.; Waggoner, L. P.; Edge, C.; Hallowell, S. F. "Canine detection odor signatures for explosives," Proc.SPIE-Int.Soc.Opt.Eng. 3575[Enforcement and Security Technologies], 291-301. 1998; Harper, R. J.; Almirall, J. R.; Furton, K. G. "Identification of dominant odor chemicals emanating from explosives for use in developing optimal training aid combinations and mimics for canine detection," *Talanta* 67(2):313-327, 2005). Surrogate continuation aids (SCAs) are training aid materials used as positive controls for detection canine training and maintenance. These SCAs should meet certain criteria, as shown in FIG. 1.

There are three types of SCAs available: a sample of an actual illicit material, a diluted sample of the illicit material, and mimics of the illicit material. The use of the actual illicit material poses a risk to the canines and handlers and requires a license to obtain, while diluted illicit materials are expensive and have questionable effectiveness. Mimics, which utilize chemicals to mimic odors of materials of interest, are generally nonhazardous, easy to obtain, and effective (Harper, R. J.; Furton, K. G. Biological Detection of Explosives. In Counterterrorist Detection Techniques of Explosives, Yinon, J., Ed.; Elsevier B. V.: 2007; pp 395-431). Unfortunately, current training aids not only dissipate active odors quickly, thereby not lasting long, but also dissipates odors at an uncontrollable rate.

Hence, there remains the need for improved training aids.

BRIEF SUMMARY

The subject invention provides novel training devices for biological detector animals, such as canines, as well as methods for preparing and using the training devices. These devices can be used to train the detectors to locate a specific material by recognizing a characteristic scent associated with the material. In some embodiments, the detector animal is a canine.

More specifically, the subject invention provides mimics in which a volatile organic compound and/or active odorant of an illicit material is encapsulated into a polymer network. In an exemplary embodiment, the training devices of the subject invention encapsulate odorants mimicking the odor of certain illicit materials, such as cocaine, within a sol-gel polymer network. By manipulating the process of molecular encapsulation and polymer network synthesis in accordance with the subject invention, the novel training devices advantageously reduce the influence of contaminants and dissipate the encapsulated odorant in a controlled fashion, facilitating improved shelf-life as compared to currently-available training devices.

In one aspect, the subject invention provides an animal training device comprising at least one active odor-causing chemical characteristic to at least one material of interest encapsulated within a polymeric network.

In certain embodiments, the material of interest is an illicit drug or an explosive. In an exemplary embodiment, the odor-causing chemical is methyl benzoate, a volatile byproduct of cocaine.

Another aspect, the subject invention provides a method of fabricating an animal training device. In some embodiments, the encapsulation process is accomplished via sol-gel chemistry.

In a specific embodiment, the method yields a template chemical encapsulated by a sol-gel polymeric network, wherein the network comprises a precursor, a solvent distinct from water, water, and a catalyst.

In some embodiments, the template chemical is an odor-causing chemical characteristic to a material of interest. In certain embodiments, the material of interest is an illicit drug or an explosive.

In an exemplary embodiment, the precursor is a silicon alkoxide comprising organic network modifiers.

In yet another aspect, the subject invention provides a canine training device, comprising methyl benzoate as an odor-causing chemical encapsulated within a sol-gel polymeric network.

Advantageously, the polymer-based aid of the subject invention allows a handler to control the odors presented to the detector animal and to become familiar with the animal's detection capabilities and thresholds, thereby increasing the effectiveness of the detector animal as well as the strength, in court proceedings, of the evidence thus produced.

Advantageously, the devices of the subject invention can be frozen, thereby prolonging their shelf-life.

Other objects, features, and advantages of the invention will be apparent to those skilled in the art from the detailed description of the invention which will now follow, taken in conjunction with the tables, drawings, and the accompanying claims.

DETAILED DISCLOSURE

The subject invention provides materials and methods for preparing novel training devices for biological detectors, such as canines, to locate a specific material by recognizing a characteristic scent associated with the material.

In an exemplary embodiment, the training device encapsulates an odorant mimicking the odor of an illicit material, such as cocaine, within a sol-gel polymer network.

By manipulating the process of molecular encapsulation and polymer network synthesis, the resulting novel training devices reduce the influence of contaminants and dissipate the encapsulated odorant in a controlled fashion, allowing for the added benefit of improved shelf-life as compared to currently-available training devices.

In one aspect, the subject invention provides an animal training device comprising at least one active odor-causing chemical that is characteristic to at least one material of interest, encapsulated within a polymeric network. In some embodiments, the device can encapsulate multiple odor-causing chemicals, each of which corresponds to a distinct material of interest.

In some embodiments, the animal belongs to the family of canine.

Figure 9A:
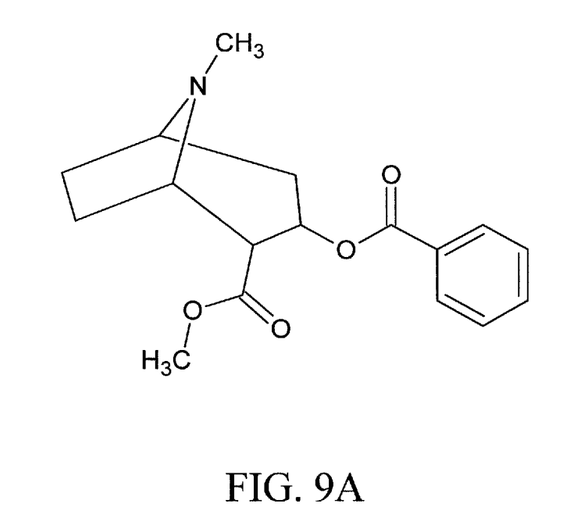
FIG. 9A shows the molecular structure of cocaine.
Figure 9B:
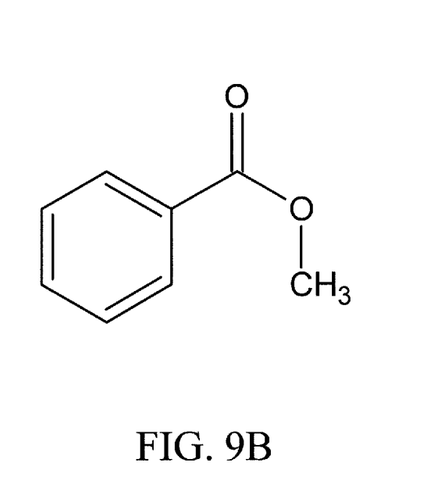
FIG. 9B shows the molecular structure of methyl benzoate.

In certain embodiments, the material of interest is an illicit drug or an explosive. In an exemplary embodiment, the odor-causing chemical is methyl benzoate (FIG. 9B), a volatile byproduct of cocaine (FIG. 9A).

Figure 10:
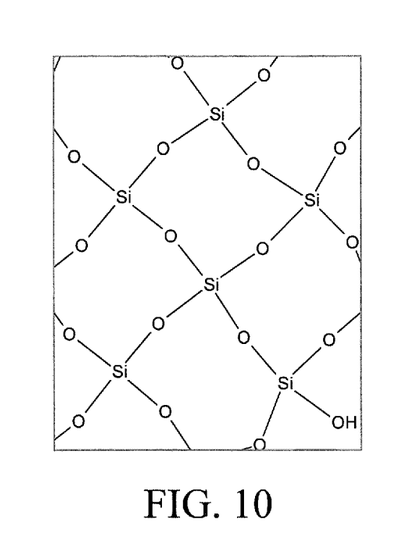
FIG. 10 shows a schematic of an exemplary sol-gel polymeric network provided herein.

In some embodiments, the encapsulation process is accomplished via sol-gel chemistry. In a specific embodiment, the sol-gel process accommodates a process in which the odorant chemical is molecularly encapsulated within the polymeric network (FIG. 10).

Figure 2:
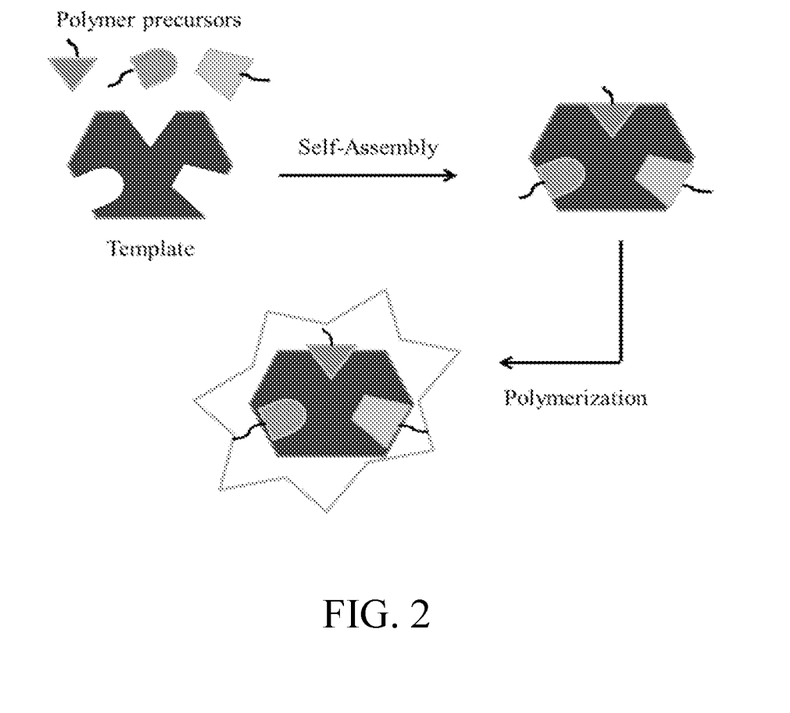
FIG. 2 shows a schematic of the molecular encapsulation process.

Molecular encapsulation is a process of preparing polymers that are preferentially selective for a particular compound, termed the "template," such that the template compound is confined within the polymer matrix (Ekberg, B.; Mosbach, K. Molecular Imprinting—A Technique for Producing Specific Separation Materials. Trends in Biotechnology 1989, 7 (4), 92-96) (FIG. 2). In an exemplary embodiment, methyl benzoate, the odorant that triggers an alert response from detection canines for cocaine, is used as the template compound.

Another aspect of the subject invention provides a method of fabricating an animal training device, comprising a template chemical encapsulated by a sol-gel polymeric network. In some embodiments, the creation of the sol-gel polymer requires the manipulation of four factors: a precursor, a solvent distinct from water, water, and a catalyst (M. Siouffi. Silica gel-based monoliths prepared by the sol-gel method: facts and inquires. Journal of Chromatography 1000, 801-818. 2011. France, Elsevier Science. 2003).

In an exemplary embodiment, the precursor is a silicon alkoxide comprising organic network modifiers, with non-limiting examples including phenylethyl trimethoxysilane (PE-TMS), tetraethylorthosilicate (TEOS), and tetramethyl orthosilicate (TMOS).

In some embodiments, the solvent that is distinct from water can be polar or non-polar. Non-limiting examples of polar and non-polar solvents include alcohols, acids, olefins, paraffins, aromatics, aliphatics, amines, ethers, ester, ketones, aldehydes, amides, nitriles, and nitroalkanes.

In some embodiments, the catalyst is an acid or a base. In an exemplary embodiment, the catalyst is hydrochloric acid (HCl). In another exemplary embodiment, the catalyst is ammonium hydroxide ($NH_4OH$).

Figure 3:
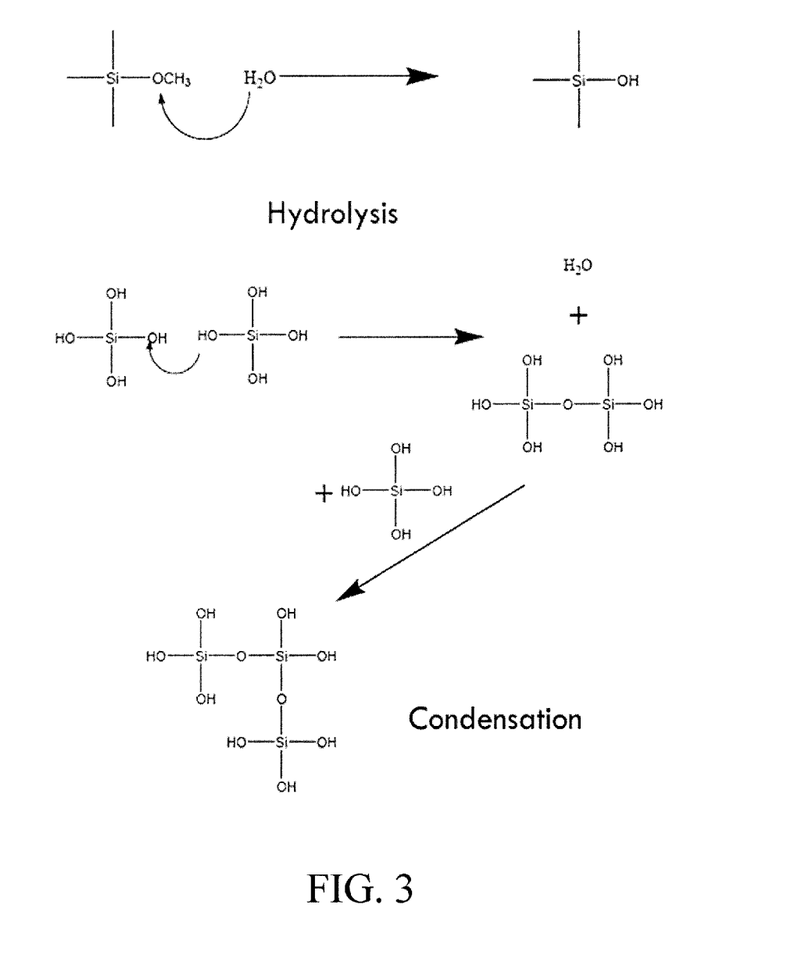
FIG. 3 shows a schematic of the hydrolysis and condensation reactions of the sol-gel polymerization process.

By way of illustration, a three-dimensional silica-based network can be synthesized by a two-step reaction process that includes hydrolysis followed by condensation (FIG. 3). Polymeric networks formed by the sol-gel process have high thermal stability and increased intermolecular interactions between the analytes and sol-gel network. Advantageously, sol-gel processes can result in polymeric networks with relatively high and adjustable porosity, allowing for a high sample-loading capacity of the target analyte such as methyl benzoate. Furthermore, the porosity of a sol-gel network can be adjusted to control the dissipation rate of the odorant chemical encapsulated therein. The sol-gel network is also easy to prepare and experiences negligible swelling, thereby reducing network distortions (Chong, S. L.; Wang, D. X.; Hayes, J. D.; Wilhite, B. W.; Malik, A. Sol-gel coating technology for the preparation of solid-phase microextraction fibers of enhanced thermal stability. Analytical Chemistry 1997, 69 (19), 3889-3898; Farrington, K.; Regan, F. Molecularly imprinted sol gel for ibuprofen: An analytical study of the factors influencing selectivity. Talanta 2009, 78 (3), 653-659).

Common sol-gel precursors used for sol-gel polymer synthesis create inorganic networks. Such polymers are highly rigid, producing cracking or breaking of the polymer when being subjected to mechanical stress. Through the introduction of network modifiers, in which an alkoxy group is substituted with an organic group that cannot be hydrolyzed, not only is a strong interaction created between the organic template and the polymer, but the rigidity of the polymer decreases, allowing for it to retain its shape (Koppetschik, K Photodegradation of Organic Photochromic Dyes Incorporated into Ormosil Matrices, 2000).

In some embodiments, the template chemical is an odor-causing chemical characteristic to a material of interest. In certain embodiments, the material of interest is an illicit drug or an explosive.

In yet another aspect, the subject invention provides a canine training device, comprising methyl benzoate as an odor-causing chemical encapsulated within a sol-gel polymeric network.

According to the subject invention, odor dissipation by molecularly encapsulated sol-gel training aids can be manipulated through the use of temperature changes, a change in containment systems, or by changing the sol-gel network of the polymer. For an existing device such as the controlled odor permeation system (COMPS), however, dissipation can only be manipulated based on the containment system.

In some embodiments, the devices of the subject invention can be frozen, halting the dissipation of all odors and thus prolonging the devices' shelf-life for improved storage capability and cost-effectiveness.

Advantageously, the sol-gel polymer training aid provided herein allows a handler to control the abundance of odor presented to the detector animal in training and familiarize himself with the animal's detection capabilities and thresholds, thereby increasing the strength of the detection result used as evidence in court proceedings.

Following are examples which illustrate procedures for practicing the invention. These examples should not be construed as limiting. All percentages are by weight and all solvent mixture proportions are by volume unless otherwise noted.

Example 1

In this Example, polymer-based training aids of the subject invention shown to dissipate at a slower rate than the current training aid mimics commercially available. Through the manipulation of the sol gel polymer recipe, it was determined whether the dissipation rate of the template could be controlled and if the percentage of odor lost over time could be decreased. The following ingredients were manipulated during the sol gel process: starting precursor, water ratios, and solvent.

Figure 11:
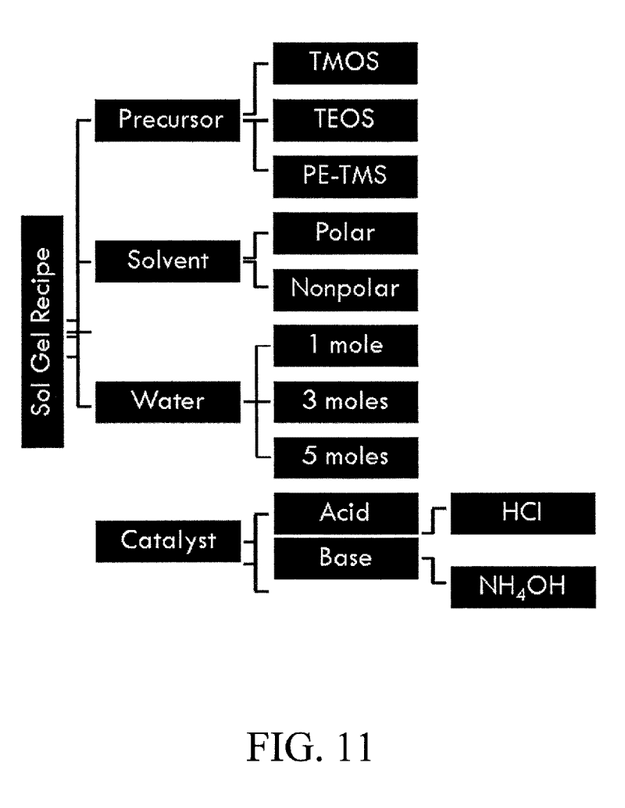
FIG. 11 shows various amounts of the ingredients used to synthesize the sol-gel polymeric networks provided herein.

Variations of polymers containing phenylethyl trimethoxysilane (PE-TMS), tetraethyl orthosilicate (TEOS), and tetramethyl orthosilicate (TMOS) as the starting precursor were used. The amount of each precursor used, as well as the relationship between the precursor and the other ingredients, were preserved and remained consistent throughout the entirety of this study (FIG. 11).

The next set of polymers tested allowed for the manipulation of water added, which is the ingredient that drives the hydrolysis reaction. Starting at five moles of water, and then decreasing the amount thereafter, the effects on the hydrolysis process during the sol-gel preparation, as well as how this affects the dissipation rates and percent loss of the methyl benzoate was determined.

The final set of polymers tested again kept the recipe amounts consistent but varied the type of solvent added. Both polar and nonpolar solvents were compared to determine if the dissolution and homogeneity of the polymer would be altered and their effects on the dissipation of the template compound.

Figure 4:
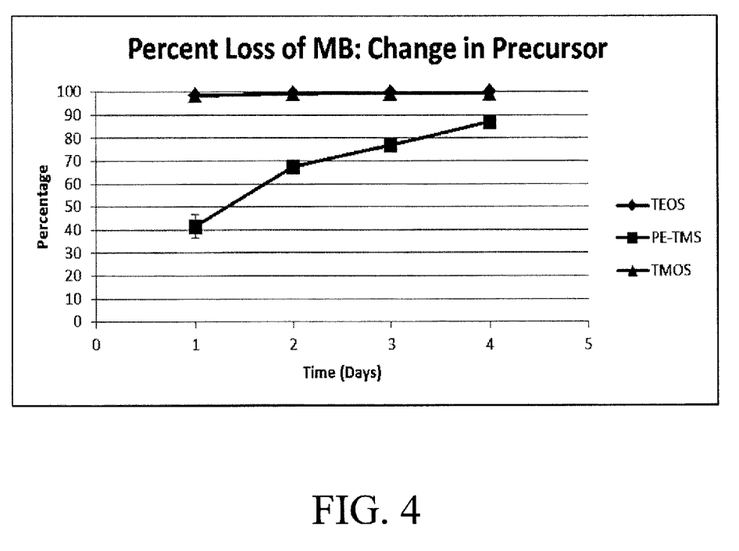
FIG. 4 shows a graph of the percent loss of methyl benzoate (MB) as a function of changing the precursor of the sol-gel polymerization.

For the samples created with varying precursors, it can be observed that the polymers synthesized with TEOS and TMOS dissipated at a much higher rate than the PE-TMS polymer. After leaving the samples open for 1 day, both TEOS and TMOS experienced close to one-hundred percent loss as seen in FIG. 4. This is most likely due to the rigidity and glass-like structure of the so-gel created by TMOS and TEOS inorganic networks. The rigidity of the network created a fragile polymer that easily cracks and shatters, causing the exemplary template compound methyl benzoate to dissipate more readily.

Figure 5:
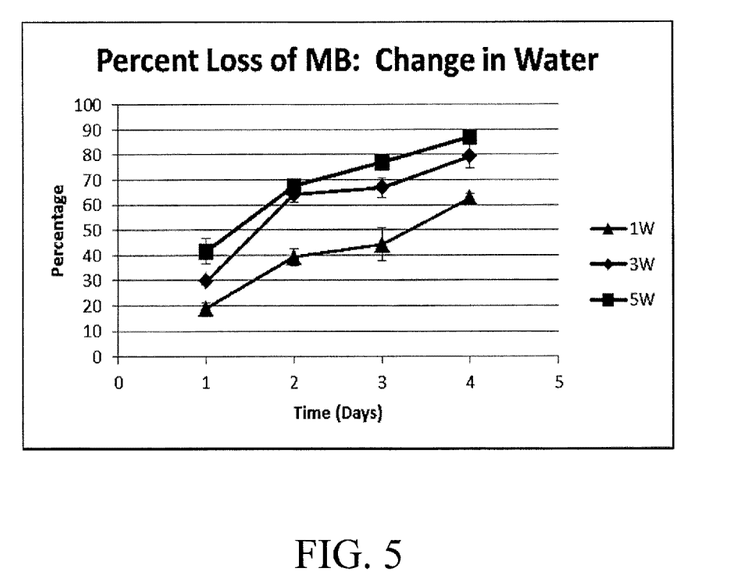
FIG. 5 is a graph showing the percent loss of methyl benzoate as a function of changing the molar concentration of water during the sol-gel polymerization.

Results obtained from polymers made from varying amounts of water show that lowering the amount of water added for hydrolysis seems to reduce the dissipation rate and percent loss of methyl benzoate slightly, as seen in FIG. 5. It is possible that the reduction of the amount of water available for hydrolysis made it less likely for the reverse hydrolysis reaction to occur, promoting a stronger, more densely packed network, which is more effective for template encapsulation. It was also observed that the template loading capacity increased as the moles of water decreased.

Figure 6:
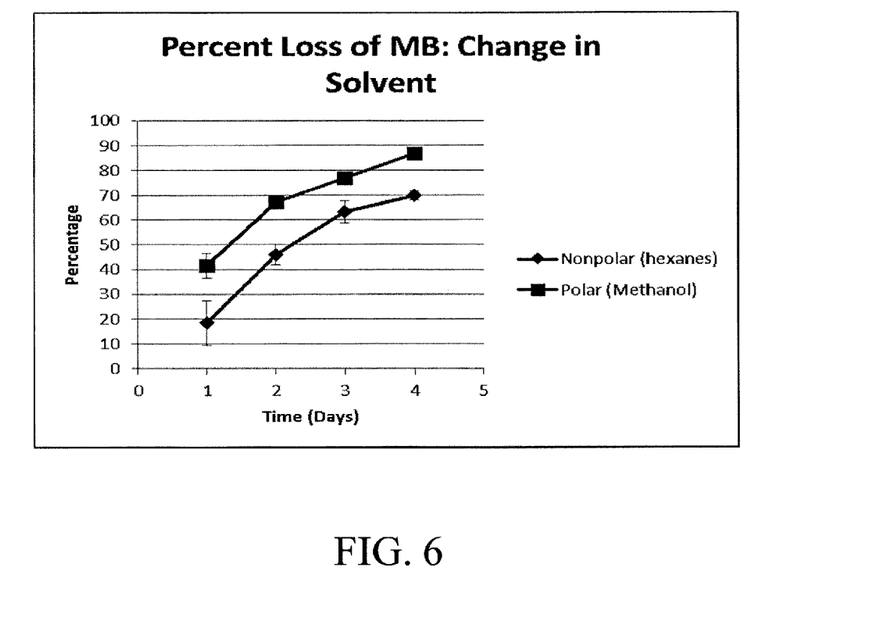
FIG. 6 demonstrates the percent loss of methyl benzoate as a function of changing the solvent of the sol-gel polymerization.

FIG. 6 shows a comparison of dissipation when different solvents were used. Changing the solvent from methanol to hexanes resulted in a slower dissipation and percent loss of methyl benzoate. The change was approximately twenty percent after 1 day of dissipation. While using a nonpolar solvent creates a nonhomogeneous polymer, the advantage of a nonpolar solvent is most likely due to the fact that hexanes evaporate more readily than methanol, leaving behind methyl benzoate, due to strong interactions with PE-TMS. Conversely, methanol will form strong hydrogen bonds with methyl benzoate, causing methyl benzoate to quickly evaporate when the solvent evaporates.

Example 2

After the synthesis of each sol-gel polymer, samples were placed in headspace vials and solid phase micro-extraction (SPME) was used to extract and collect the methyl benzoate dissipating from the sol-gel polymer before injecting the extracted methyl benzoate into the gas chromatography-mass spectrometer (GC-MS) for data collection. When samples were not being tested, they remained open, allowing methyl benzoate to dissipate. Samples were tested daily over a span of five days. Each test was completed in triplicate.

Figure 7:
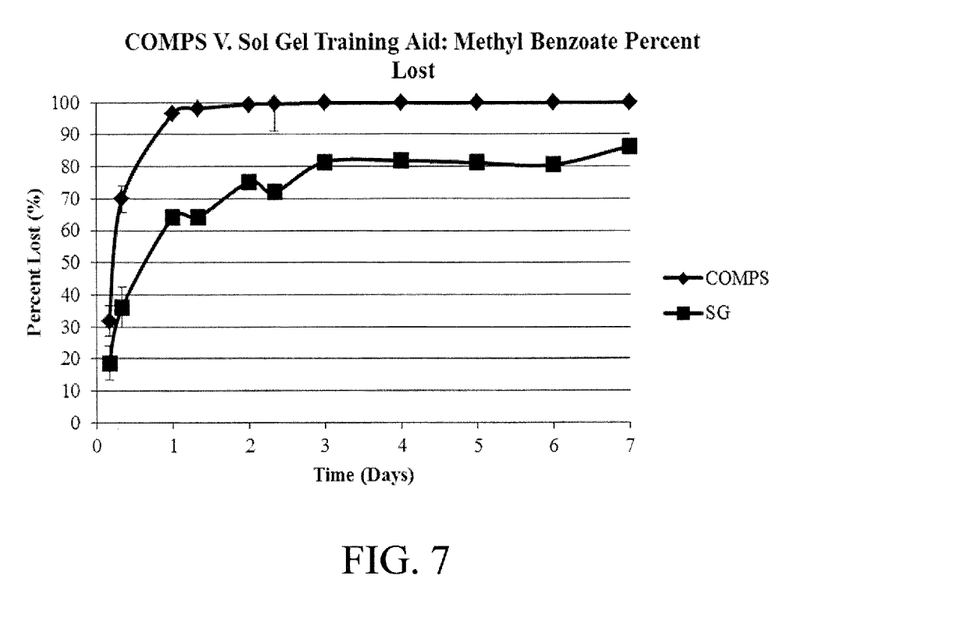
FIG. 7 shows a direct comparison of dissipation between the device disclosed in the subject invention (i.e., sol-gel, or SG, system) and the currently available device named controlled odor permeation system (COMPS).

Using the SPME/GC-MS method, the dissipation rates of methyl benzoate from the sol-gel training aids and the COMPSs were compared over time. The sol-gel training aid proved to last longer, dissipating at a rate of approximately 55 ng/s, while the ordor in the COMPS dissipated much more quickly, at a rate of approximately 361 ng/s. FIG. 7 shows that with continuous dissipation, COMPSs would only last for about 24 hours, while after 7 days the sol-gel training aids were still dissipating odor.

Example 3

Figure 8:
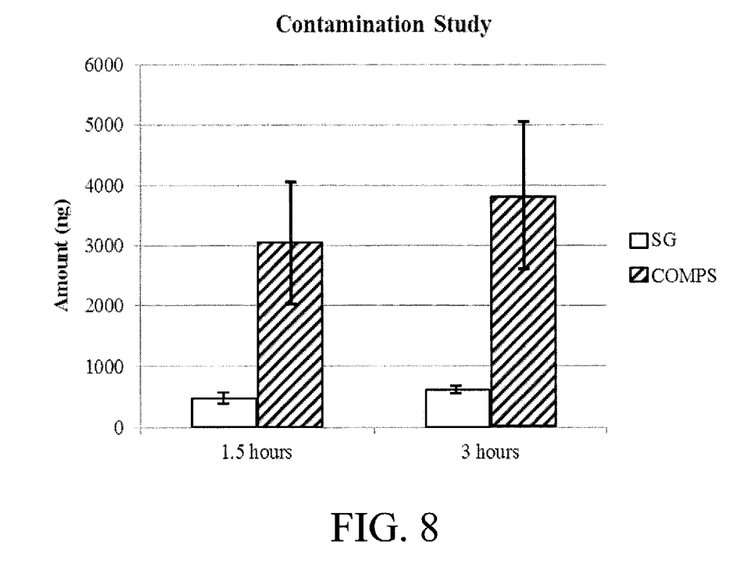
FIG. 8 demonstrates the results of the contamination study comparing the device disclosed in the subject invention to the COMPS.

While both the sol-gel training aids and the COMPSs are prone to contamination, COMPSs are much more susceptible to contamination than the sol-gel training aids. After about 1.5 hours, the COMPSs were contaminated with approximately 3064 ng of methyl benzoate, while the sol-gel training aids only contained 487 ng of methyl benzoate. After 3 hours, the COMPSs were contaminated with approximately 3836 ng of methyl benzoate, while the sol-gel training aids only contained about 626 ng of methyl benzoate (FIG. 8).

Example 4

Adjusting the ingredients of the sol-gel polymer, such as the amount of water added, the amount and the type of catalyst, and the type of precursor changes the dissipation rate. For example, under the same conditions and following a period of 24 hours, a sample of polymer comprising about 1 mole of water lost approximately 18% of its odor, while a sample comprising approximate 3 moles of water lost about 42% of its odor. COMPSs, on the other hand, are not capable to withstand such extensive manipulation.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. A animal training device, comprising, encapsulated within a 3D polymeric network of phenylethyl trimethoxysilane (PE-TMS), tetraethylorthosilicate (TEOS), and tetramethyl orthosilicate (TMOS), at least one active odor-causing chemical that is characteristic to at least one material of interest, wherein the at least one active odor-causing chemical interacts with the PE-TMS of the 3D polymeric network.

2. The device according to claim 1, the material of interest being an illicit drug.

3. The device according to claim 1, the material of interest being an explosive.

4. The device according to claim 1, the active odor-causing chemical being methyl benzoate.

5. The device according to claim 1, having a dissipation rate of the active odor-causing chemical that is controlled by the temperature of the device.

6. The device according to claim 1, comprising methyl benzoate interacting with PE-TMS and forming hydrogen bonds with a solvent that is not water, said solvent being methanol.

7. An animal training device, comprising methyl benzoate encapsulated within a 3D polymeric network of phenylethyl trimethoxysilane (PE-TMS), tetraethylorthosilicate (TEOS), and tetramethyl orthosilicate (TMOS), wherein the methyl benzoate interacts with the PE-TMS of the 3D polymeric network and forms hydrogen bonds with a solvent that is not water, wherein the 3D polymeric network is a product of hydrolysis followed by condensation of PE-TMS, TEOS and TMOS, and wherein the solvent is methanol.

8. The device according to claim 7, comprising multiple odor-causing chemicals, each corresponding to a distinct material of interest.

9. The device according to claim 7, the hydrolysis occurring in the presence of 1 mole of water and a catalyst selected from hydrochloric acid (HCl) and ammonium hydroxide ($NH_4OH$).

10. A method of fabricating an animal training device comprising encapsulating a template chemical in a sol-gel polymeric network, wherein the network comprises a precursor, a solvent distinct from water, water, and a catalyst, wherein the animal training device comprises encapsulated within a 3D polymeric network of phenylethyl trimethoxysilane (PE-TMS), tetraethylorthosilicate (TEOS), and tetramethyl orthosilicate (TMOS), at least one active odor-causing chemical that is characteristic to at least one material of interest, wherein the at least one active odor-causing chemical interacts with the PE-TMS of the 3D polymeric network.

11. The method according to claim 10, the material of interest being an illicit drug.

12. The method according to claim 10, the material of interest being an explosive.

13. The method, according to claim 10, the catalyst being selected from hydrochloric acid (HCl) and ammonium hydroxide ($NH_4OH$).

14. A method of training an animal, the method comprising training the animal to recognize a characteristic scent of the at least one active odor-causing chemical encapsulated within the animal training device according to claim 1.

* * * * *